(No Model.)  2 Sheets—Sheet 1.

E. R. ROBINSON.
TROLLEY WHEEL.

No. 600,890.  Patented Mar. 22, 1898.

Witnesses:
W. Ellwood Allen
F. R. Proctor

Inventor:
Elbert R. Robinson
By Knight Bros
Attys.

(No Model.) 2 Sheets—Sheet 2.

E. R. ROBINSON.
TROLLEY WHEEL.

No. 600,890. Patented Mar. 22, 1898.

Witnesses.
W. Ellwood Allen.
F. R. Preston.

Inventor.
Elbert R. Robinson.
By Knight Bros.
Attys.

THE NORRIS PETERS CO., PHOTO-LITHO., WASHINGTON, D. C.

UNITED STATES PATENT OFFICE.

ELBERT R. ROBINSON, OF CHICAGO, ILLINOIS.

TROLLEY-WHEEL.

SPECIFICATION forming part of Letters Patent No. 600,890, dated March 22, 1898.

Application filed November 28, 1896. Serial No. 613,843. (No model.)

*To all whom it may concern:*

Be it known that I, ELBERT R. ROBINSON, a citizen of the United States, and a resident of Chicago, in the county of Cook and State of Illinois, have invented Improvements in and Relating to Wheels, of which the following is a specification.

My invention has for its object to provide wheels of any character with fillings or linings of suitable material, either for restoring them to original condition when worn or for better adapting them for the purposes intended.

A further object is to combine with the fillings or linings of wheels used for electrical purposes offshoots or projections of the filling material, which extend through openings in the wheels to electrically connect the linings or fillings with their axes or trolley-arms independently of the main body of the wheel, and thus reduce the electrical resistance of the wheel.

A further object is to provide a convenient mode of putting the invention into effect by casting the linings or fillings in the peripheries of the wheels, which are suitably prepared beforehand.

While for purposes of illustration I shall proceed to describe my invention with special reference to trolley-wheels wherein the effect is to increase the conductivity and wearing qualities or to restore them when worn out, the same principles are involved in all of its widely-diversified applications, and I therefore desire it to be understood that my invention is not restricted in scope to the application particularly described. For example, it may be desired to restore an old wheel or manufacture a new wheel for use as a cable-sheave by supplying it with a filling of hard metal which will increase its wearing qualities, or it might be desirable to supply a wheel for use as a pulley with a filling of softer metal or of low-friction or high-friction metals in order to correspondingly modify the effect upon the belt or other mechanical element which operates in connection with the wheel. My invention will accomplish all these and many more objects, as will be readily understood.

Figure 1:
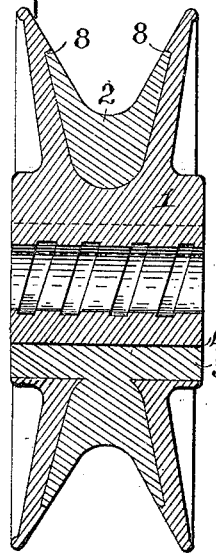
Figure 2:
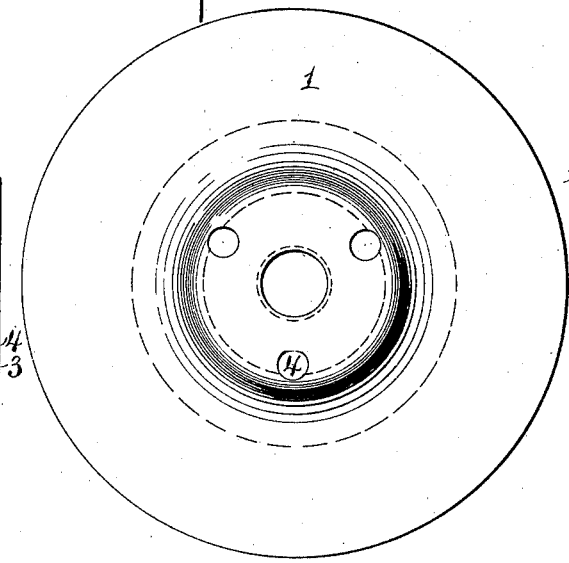
Figure 3:
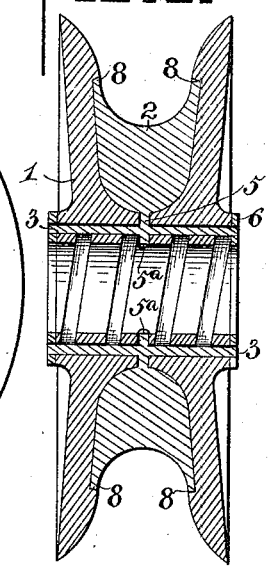
Figure 4:
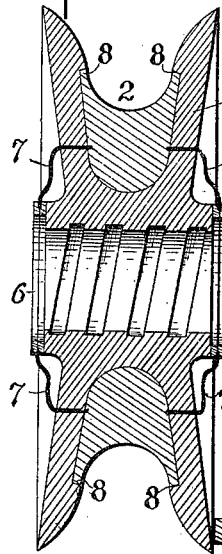
Figures 5, 7:
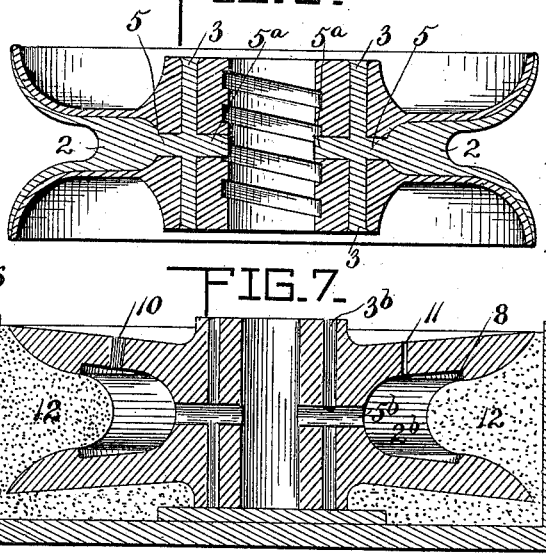
Figure 6:
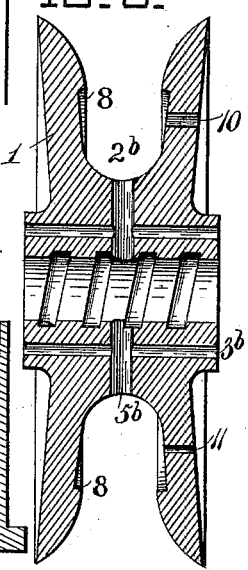
Figure 8:
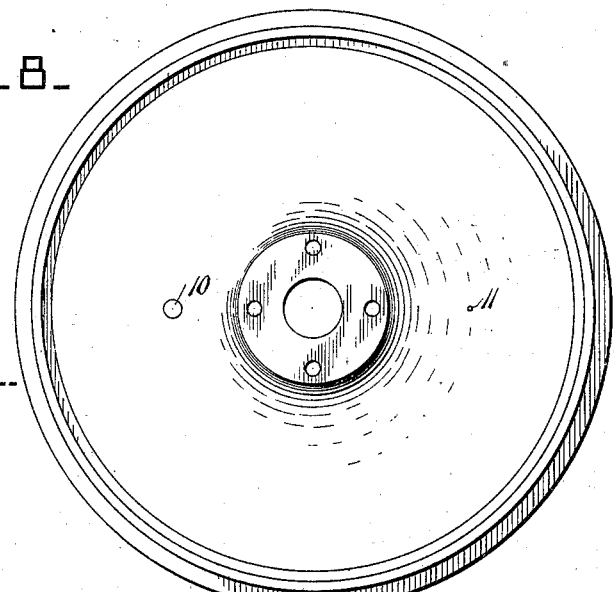
Figure 11:
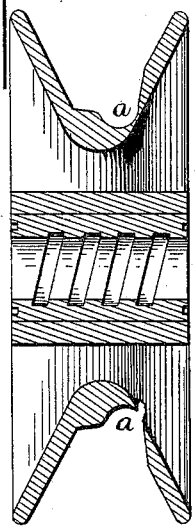
Figure 12:
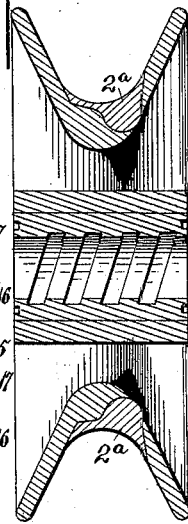
Figure 9:
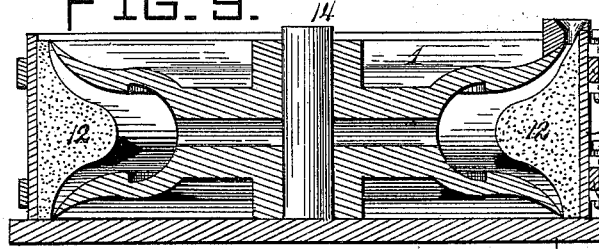
Figure 10:
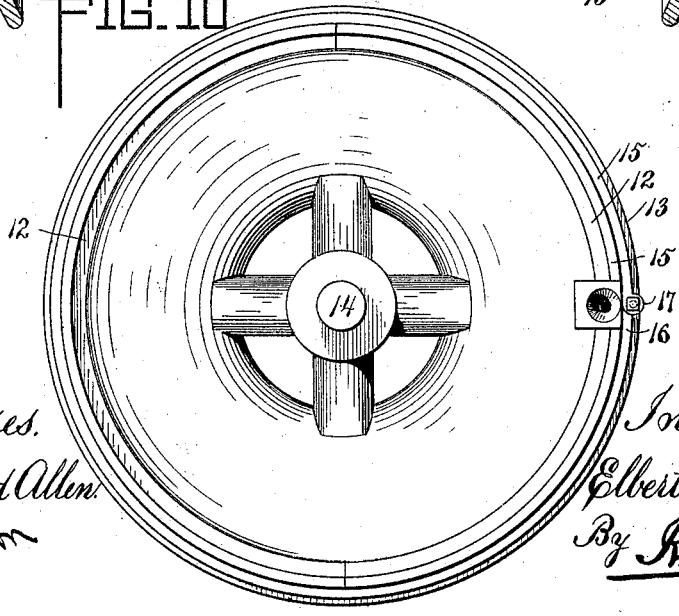

In the accompanying drawings, Figures 1 and 2 are respectively axial section and a side elevation of a wheel embodying a filling and lateral offshoots or extensions for electrically connecting the filling with the trolley-arm or other support independently of the main body of the wheel. Figs. 3, 4, and 5 are axial views illustrating modifications embodying the same ideas. Figs. 6 and 7 represent, respectively, axial sections of a wheel-body prepared to receive the filling and said wheel-body set set up in a mold ready to have the molten metal poured in to fill the cavities. Fig. 8 is a plan of Fig. 7. Figs. 9 and 10 are respectively an axial section and a plan representing the manner of casting a filling of different shape and by the use of a different mold. Figs. 11 and 12 are axial sections showing, respectively, a wheel which has been subjected to ordinary wear and the same wheel repaired by the filling in accordance with my invention.

Referring to Figs. 1 to 5, 1 represents a trolley-wheel of common form, and 2 is a filling in the groove of said wheel and provided with integral offshoots or projections 3, which serve to electrically connect the bearing-surface of the wheel with the trolley-arm or other holder independent of the main body of the wheel 1. In Figs. 1 and 2 the connection between filling 2 and offshoots 3 is obtained by having bores 4, formed in the wheel to receive the offshoots, intersect the grooves in the periphery of the wheel. In Fig. 3 this connection is made by radial offsets 5, and the conductivity is increased by having said offsets 5 continue radially inward, so as to contact with the axle, as indicated at 5ª, Figs. 3 and 5. In Fig. 4 the radial and lateral offsets are dispensed with and rings or washers 6, connected with the filling 2 by wires or equivalent outside conductors 7, are employed. Fig. 3 also employs the rings or washers 6, but these are electrically connected and held in place through the medium of lateral offsets 3, hereinbefore referred to. Of these figures it is desirable to form shoulders 8 in the flanges of the wheel to assist in retaining the filling 2 in place, unless, as in Fig. 5, it is desirable to form a lining for the entire groove of the wheel, in which case the shoulders 8 are omitted and the integrity of the filling in its circular form is depended on for holding the same in place.

In Figs. 6 and 7 is illustrated the convenient method of supplying the filling together with the offsets to the interior of the wheel. The wheel is provided with cavities 2$^b$, lateral bores 3$^b$, radial bores 5$^b$, and the shoulders 8, if desired, and one of the flanges is then bored, as shown at 10, to receive molten metal, which may be introduced through the ordinary runner and with gas-vents 11. The wheel thus prepared is then set up in any suitable mold—such, for instance, as that illustrated—with suitably-formed cores 12, and the filling is poured in and allowed to cool. A modified form of mold is shown in Figs. 9 and 10, and this consists simply in the base 13, having a projecting center core 14, with surrounding cores 12$^a$, and a core-box 15, formed in separate parts and held together by straps 16, with hinged joints 17. In Fig. 11 is indicated a convenient way of repairing worn-out trolley-wheels. In this view, $a$ represents the groove or unequal wear to which the wheel is subject. To repair this, a filling 2$^a$ is provided in any suitable manner—such, for instance, as described with reference to Figs. 6 and 7 or with reference to Figs. 9 and 10.

18 is a runner applied to the form of mold shown in Figs. 9 and 10.

I do not herein claim the manner of making a brass, copper, or other hard-metal filling of high electric conductivity lay to an iron wheel in the act of casting, nor do I claim the use of a sand ring in connection with a wheel, as both these features form parts of another application filed by me.

Having thus described my invention, the following is what I claim as new therein and desire to secure by Letters Patent:

1. A grooved trolley-wheel comprising integral hub, sides and flanges, formed of one metal and with a deep peripheral groove and offshoots or bores, and a filling of another material cast into the deep groove of the wheel, partly filling the same while leaving the projecting flanges beyond said filling, and into the offshoots or bores to extend said filling to the mounting for the wheel, as explained.

2. A grooved trolley-wheel comprising integral hub, sides and flanges, formed of one metal and with a deep peripheral groove having lateral undercuts extending into the flanges and offshoots or bores, and a filling of another metal cast into the deep groove of the wheel, partly filling the same while leaving the projecting flanges beyond said filling, and into the offshoots or bores to extend said filling to the mounting for the wheel, as explained.

3. A flanged grooved wheel provided with a hub and having between its flanges a peripheral filling with lateral and radial offshoots integral with the said filling and leading respectively to the ends of the hub and the axial opening in the wheel, for the purpose explained.

4. A flanged grooved wheel having within its peripheral groove, a filling, with lateral offshoots integral with said filling, and the conducting-rings at the ends of the hub electrically connected with the offshoots, as explained.

5. The combination of a metallic wheel having integral hub and peripheral flanges, a peripheral filling in the wheel of higher electrical conductive metal, rings on the ends of the hub of similar metal, and electrical conductors connecting the rings with the filling, as explained.

ELBERT R. ROBINSON.

Witnesses:
WM. CLIFTON,
L. N. DRISH.